United States Patent [19]

Mochizuki

[11] Patent Number: 4,758,733

[45] Date of Patent: Jul. 19, 1988

[54] A LABYRINTHINE LIGHT SCATTERING-TYPE SMOKE DETECTOR

[75] Inventor: Mikio Mochizuki, Tokyo, Japan

[73] Assignee: Nohmi Bosai Kogyo Co., Ltd., Tokyo, Japan

[21] Appl. No.: 897,705

[22] Filed: Aug. 18, 1986

[30] Foreign Application Priority Data

Aug. 24, 1985 [JP] Japan .......................... 60-129055[U]

[51] Int. Cl.[4] ...................... G01N 15/07; G01N 21/00

[52] U.S. Cl. ..................................... 250/574; 356/439

[58] Field of Search ........................ 250/574; 356/338; 340/630; 356/438, 439

[56] References Cited

U.S. PATENT DOCUMENTS 4,469,953 9/1984 Fujisawa et al. .................... 250/574

*Primary Examiner*—David C. Nelms
*Assistant Examiner*—William L. Oen
*Attorney, Agent, or Firm*—Tilton, Fallon, Lungmus & Chestnut

[57] ABSTRACT

A light-scattering-type smoke detector having a projecting element and a light receiving element surrounded by a labyrinth is disclosed wherein the labyrinth comprises an array of a plurality of light shielding columns arranged in a circle each having a substantially J-shaped cross section, and the head portion of each column is inclined relative to the bisector of an angle formed between the lines connecting a first reflecting point with the projecting and light receiving elements, the light shielding columns having darkly colored light reflective surfaces.

4 Claims, 1 Drawing Sheet

A LABYRINTHINE LIGHT SCATTERING-TYPE SMOKE DETECTOR

BACKGROUND OF THE INVENTION

The present invention relates to a smoke detector, and more particularly to a light-scattering-type smoke detector.

In a light-scattering-type smoke detector, when the smoke enters into its smoke-detecting chamber the light issued from a projecting element is adapted to be scattered and then be received by a light receiving element. Since the smoke-detecting chamber is formed so that it allows the free entry of ambient air, but not entry of outside light it is surrounded by a so-called labyrinth.

The labyrinth known hitherto was formed by a plurality of light shielding columns each having a T-shaped cross section and arranged in a circle, the columns being colored black and delustred. However, in conventional light-scattering-type smoke detectors, in order to improve the light shielding characteristics the heads of the T-shaped light shielding columns constituting the labyrinth were arranged to be in surfrace contact with the outer periphery of the labyrinth, the smoke entrance area formed at the outer periphery of the labyrinth then being very narrow. Therefore, in order to ensure the quantity of smoke necessary for detection the outer diameter of the labyrinth has to be made large, this necessarily making the size of the smoke detector large.

Further, since all of the light issuing from the projecting element to impinge upon the inner wall of the labyrinth is not absorbed there, the scattered light incidents upon the light receiving element so that the noise light output N of the light reflected from the inner wall of the labyrinth becomes large.

Therefore, the ratio of the signal light output S of the light scattered by the smoke to the noise light output N, i.e. S/N decreases, lowering the performance characteristics of this type of smoke detector.

SUMMARY OF THE INVENTION

It is a primary object of the present invention to provide a light-scattering-type smoke detector which has small dimensions.

It is another object of the present invention to provide a light-scattering-type smoke detector which has a larger S/N ratio than that of a conventional smoke detector of this type.

It is a further object of the present invention to provide a light-scattering-type smoke detector in which the total area of the openings for allowing the outside atmosphere into the labyrinth is made large relative to the area of the peripheral wall of the labyrinth.

According to the present invention in a light-scattering-type smoke detector having a projecting element and a light receiving element surrounded by a labyrinth, the labyrinth is formed of a plurality of light shielding columns each having a substantially J-shaped cross section, the head portion of each column being inclined relative to the bisector of the lines connecting its first reflecting point to the projecting element and the light receiving element, and the rear ends of such head portion are disposed within the concave space surrounded by the head and leg portions of the neighboring light shielding column, the surfaces of the light shielding columns being colored a dark reflective color.

Thus, according to the present invention, in operation, upon impinging of the light issued from the projecting element upon the first reflecting point on the head portion of the light shielding column, a part of the light is absorbed by the head portion, the remaining part being reflected as a first reflected light, but in this case, since the head portion is inclined relative to the bisector of the angle formed between the lines connecting the first reflecting point with the projecting and the light receiving element this first reflecting light cannot impinge upon the light receiving element. However, the smoke is guided by the leg portions of the light shielding columns to enter the labyrinth, impinging upon the head portions of the light shielding columns.

BRIEF DESCRIPTION OF THE DRAWINGS

These and other objects of the present invention will become more readily apparent upon reading the following specification and upon reference to the accompanying drawings, in which.

DESCRIPTION OF THE PREFERRED EMBODIMENT

Figure 1:
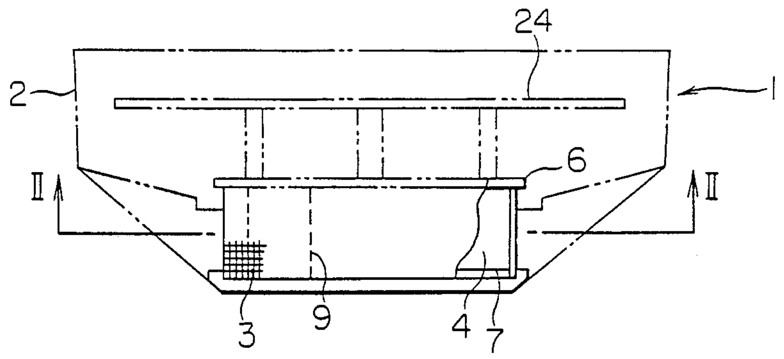
FIG. 1 is an elevational view of a light-scattering-type smoke detector provided by the present invention.

As shown in FIG. 1, disposed within the cover 2 of a light-scattering-type smoke detector 1 is a labyrinth 4 surrounded by an insect repellent net 3.

Figure 2:
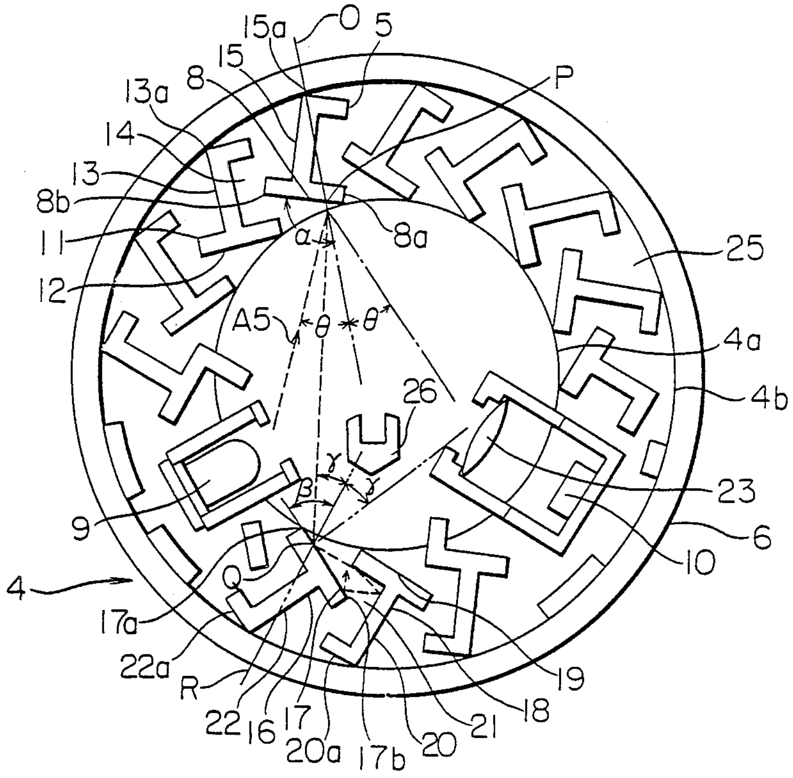
FIG. 2 is a sectional view of an embodiment of the present invention taken along the lines II—II of FIG. 1.

As shown in FIG. 2 the labyrinth 4 comprises an array of a plurality of light shielding columns 5 each having a substantially J-shaped cross section, arranged in a circle, their upper and lower ends being closed by bottom plates 6 and 7 (see FIG. 1). The surfaces of the columns 5 and the inner surfaces of the bottom plates 6, 7 are darkly colored and have light reflecting properties.

As shown in FIG. 2 for a typical one the head portion 8 of the column 5 is inclined at its first light reflecting point P relative to the bisector O of the angle $2\theta$ formed between the lines connecting the point P with the projecting element 9 and the light receiving element 10 by an angle $\alpha$, which does not include 90°.

The forward ends 8*a* of the head portion 8 lie on an inner periphery 4*a* of the labyrinth 4, the rearward ends 8*b* being disposed within the concave spaces 14 each formed by the head portion 12 and the leg portion 13 of the light shielding column 11 adjoining the light shielding column 5. The bottoms 13*a*, 15*a* of the leg portions 13, 15 of the light shielding columns 5, 11 lie on the outer periphery 4*b* of the labyrinth 4 so as to be in point contact therewith.

Thus the first reflected light reflected at the first reflecting point P of the head portion 8 is reflected by the head portion 17 of another light shielding column 16, and in this case the head portion 17*a* of the light shielding column 16 is inclined relative to the bisector R of the angle $2\gamma$ formed between the lines connecting the second reflecting point Q of the head portion 17 of the light shielding column 16 with the first light reflecting point P of the head portion 8 of the light shielding column 5 and the light receiving element 10 by an angle $\beta$, which does not include 90°.

The forward end 17*a* of the head portion 17 of the light shielding column 16 lie on the inner periphery 4*a* of the labyrinth 4, the rearward end 17*b* of the head portion 17 being disposed within the concave space 21 formed by the head portion 19 and the leg portion 20 of the light shielding column 18 as is typically indicated in FIG. 2 for the light shielding column 16. The ends of the bottom portions 22*a*, 20*a* of the leg portions of the light shielding columns 16, 18 are in point contact with the outer periphery 4*b* of the labyrinth 4.

Further, in FIG. 2 the reference numeral 23 indicates a lens mounted in front of the light receiving element 10, 24 a printed circuit board, and 26 a light shield member. Thus the optical axes of the projecting and light receiving elements 9, 10 are substantially in parallel with the bottom walls 6, 7 and intersect each other near the center axis of the labyrinth 4, the light beam issued from the projecting element 9 and being directed in the direction indicated by the arrow A5, impinges upon the head portion 8 of the light shielding column 5 a part of the light being absorbed thereby, the remaining light being reflected at the first reflecting point P to form the first reflected light.

In this case, since the head portion 8 of the light shield column 5 is inclined relative to the bisector 0 of the angle $2\theta$ formed between the lines connecting the first reflecting point P on the head portion 8 with the projecting element 9 and the light receiving element 10 this first reflecting light does not travel along the line connecting the first reflecting point P and the light receiving element 10, but instead proceeds towards the head portion 17 of the light shielding column 16. The light impinging upon the head portion 17 is partially absorbed thereof, the remaining light being reflected at the second reflecting point Q to form the second reflected light beam. In this case, since the head portion 17 is inclined relative to the bisector R of the angle $2\gamma$ formed between the lines connecting the second reflecting point Q with the first reflecting point P on the head portion 8 of the light shielding column 5 and the light receiving element 10 the second reflected light does not travel along the line connecting the second reflecting point Q to the light receiving element 10, but impinges upon the head portion 19 of the adjoining light shielding column 18. By this repeated absorption and reflection of the light beam issued from the projecting element 9 the travel distance of the light is made longer, thus the light from the projecting element 9 is remarkably attenuated. On the other hand, upon occurrence of a fire, the smoke enters the labyrinth 4 through the gaps between the light shielding columns 5, 11, 16, 18 etc. In this case, since the bottoms 13*a*, 15*a*, 20*a*, 22*a* of their leg portions are in point contact with the outer periphery of the labyrinth 4 the area of the opening 25 relative to the outer peripheral wall surface of the labyrinth 4 is made large, thus allowing flow of greater amounts of smoke.

The smoke flowing through the openings 25 is guided by the leg portions 13, 15, 20, 22 and enters the labyrinth 4 at a slower speed while impinging upon the head portions 8, 12, 17, 19.

It will be appreciated that in according to the present invention the light beam issued from the projecting element is partly absorbed and the remaining light is reflected forwards by the head portions of the light shielding columns, but the reflected light does not impinge upon the light receiving element. In other words, since the head portions are inclined relative to the bisector of the angle formed between the lines connecting the first reflecting point with the projecting and light receiving element the reflected light does not travel along the line connecting the first reflecting point to the light receiving element. Therefore, since the component of the noise light output N becomes small the S/N ratio is increased, improving the performance of the smoke detector.

Further, by the use of light shielding columns each having a substantially J-shaped cross section the total area of the openings relative to the area of the peripheral wall of the labyrinth is made larger than that obtained with the conventional shielding columns having a T-shaped cross section. Consequently, since the total opening available is large in proportion to the diameter of the labyrinth, thus the smoke detector can be made smaller.

Moreover, since the head portion of the other light shield column is inclined relative to the bisector of the angle formed between the lines connecting the second reflecting portion with the first reflecting point and the light receiving element the second reflected light does not travel along the line connecting the second reflecting point to the light receiving element, so no reflecting light impinges upon the light receiving element.

With the increase in the travel distance of the light issued from the projecting element by its repeated absorbtion and reflection, so that the noise light is enormously attenuated. One experiment conducted proved that the S/N ratio was about 10, whereas the S/N ratio in a conventional smoke detector of comparable capacity indicated a value of 2 to 3.

It is to be understood that although a single embodiment of the present invention has been illustrated and described, the present invention is not to be limited thereto except insofar as such limitations are included in the following claims.

What is claimed is:

1. A labyrinthine light-scattering-type smoke detector comprising a generally cylindrical housing including end walls and a labyrinthine side wall, a light projecting element and a light receiving element within said housing labyrinthine side wall, a light shield member interposed between said light projecting and receiving elements, said side wall being formed of a plurality of identical light shielding columns each having a generally J-shaped cross section arranged in a circle, said J-shaped cross section including a head portion, a leg portion and a rear portion in proceeding radially outwardly of said housing with each portion being defined by parallel planar surfaces, the head portion of each of said light shielding columns having a first reflecting point thereon, each head portion being inclined relative to the bisector of an angle between a pair of lines intersecting at said first reflecting point and connecting said first reflecting point with said projecting element and said light receiving element to provide a radially inward end part and a radially outward end part of said head portion, said radially outward end part of said head portion being disposed within a space defined by the head and leg portions of an adjacent light shielding column, said light shielding columns having darkly colored light reflecting surfaces.

2. A light-scattering-type smoke detector as claimed in claim 1 wherein said bottom walls have darkly colored light reflecting inner surfaces.

3. A labyrinthine light-scattering-type smoke detector as claimed in claim 1 wherein said head portion providing the first reflecting point of said head portion of a first light shielding column is disposed relative to the head portion providing a second reflecting point formed on the head protion of a second of said light shielding columns to have a light beam reflected from said first column impinge on said second column.

4. A labyrinthine light-scattering-type smoke detector as claimed in claim 3 wherein said head portion of said second light shielding column is inclined relative to the bisector of an angle formed between a pair of lines intersecting at said second reflecting point and connecting said second reflecting point with said first reflecting point and said light receiving element.

* * * * *